United States Patent
Fieldman (10) Patent No.: US 10,744,713 B2
(45) Date of Patent: Aug. 18, 2020

(54) METHODS AND BREAKABLE SUPPORTS FOR ADDITIVE MANUFACTURING

(71) Applicant: GENERAL ELECTRIC COMPANY, Schenectady, NY (US)

(72) Inventor: Zachary David Fieldman, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 616 days.

(21) Appl. No.: 15/042,001

(22) Filed: Feb. 11, 2016

(65) Prior Publication Data

US 2017/0232671 A1  Aug. 17, 2017

(51) Int. Cl.
| | |
|---|---|
| *B22F 3/105* | (2006.01) |
| *B29C 64/153* | (2017.01) |
| *B29C 64/40* | (2017.01) |
| *B33Y 10/00* | (2015.01) |
| *B33Y 30/00* | (2015.01) |

(52) U.S. Cl.
CPC .......... *B29C 64/153* (2017.08); *B22F 3/1055* (2013.01); *B29C 64/40* (2017.08); *B22F 2003/1058* (2013.01); *B33Y 10/00* (2014.12); *B33Y 30/00* (2014.12); *Y02P 10/295* (2015.11)

(58) Field of Classification Search
CPC ..... B29C 64/40; B29C 64/153; B22F 3/1055; B22F 2003/1058; B33Y 40/00
See application file for complete search history.

(56) References Cited

U.S. PATENT DOCUMENTS

| | | | |
|---|---|---|---|
| 4,863,538 A | 9/1989 | Deckard | |
| 5,460,758 A | 10/1995 | Langer et al. | |
| 5,529,471 A | 6/1996 | Khoshevis | |
| 5,656,230 A | 8/1997 | Khoshevis | |
| 5,837,960 A | 11/1998 | Lewis et al. | |
| 5,897,825 A | 4/1999 | Fruth et al. | |
| 6,042,774 A * | 3/2000 | Wilkening | B23K 26/34 |
| | | | 264/460 |
| 6,471,800 B2 | 10/2002 | Jang et al. | |
| 6,995,334 B1 | 2/2006 | Kovacevic et al. | |
| 7,381,921 B2 | 6/2008 | Hagemeister et al. | |
| (Continued) | | | |

FOREIGN PATENT DOCUMENTS

| | | |
|---|---|---|
| EP | 2570595 A1 | 3/2013 |
| JP | 2015-81071 A | 4/2015 |
| (Continued) | | |

OTHER PUBLICATIONS

Extended European Search Report and Opinion issued in connection with corresponding EP Application No. 17155569.1 dated Jul. 3, 2017.

(Continued)

*Primary Examiner* — Peter L Vajda
(74) *Attorney, Agent, or Firm* — Dority & Manning, P.A.

(57) ABSTRACT

The present disclosure generally relates to methods for additive manufacturing (AM) that utilize breakable structures in the process of building objects, as well as novel breakable support structures to be used within these AM processes. A support structure includes a weakened portion and the object includes an outlet. The method includes breaking the removable support structure at the weakened portion into at least two parts.

19 Claims, 4 Drawing Sheets

(56) References Cited

U.S. PATENT DOCUMENTS

| | | |
|---|---|---|
| 7,435,072 B2 | 10/2008 | Collins et al. |
| 8,470,234 B2 | 6/2013 | Clark |
| 8,506,836 B2 | 8/2013 | Szuromi et al. |
| 8,684,069 B2 | 4/2014 | Mottin et al. |
| 9,188,341 B2 | 11/2015 | McMasters et al. |
| 2002/0062909 A1 | 5/2002 | Jang et al. |
| 2013/0071562 A1 | 3/2013 | Szuromi et al. |
| 2013/0316084 A1 | 11/2013 | Szuromi et al. |
| 2014/0251481 A1 | 9/2014 | Kroll et al. |
| 2014/0335313 A1 | 11/2014 | Chou et al. |
| 2015/0021379 A1 | 1/2015 | Albrecht et al. |
| 2016/0009039 A1 | 1/2016 | Blanchet |
| 2016/0031160 A1 | 2/2016 | Din et al. |
| 2016/0229127 A1* | 8/2016 | Halliday ............. B29C 67/0092 |
| 2017/0232511 A1 | 8/2017 | Fieldman et al. |
| 2017/0232512 A1 | 8/2017 | Joerger |
| 2017/0232670 A1 | 8/2017 | Joerger et al. |
| 2017/0232672 A1 | 8/2017 | Fieldman et al. |
| 2017/0232682 A1 | 8/2017 | Alcantara Marte et al. |
| 2017/0232683 A1 | 8/2017 | Alcantara Marte et al. |

FOREIGN PATENT DOCUMENTS

| | | |
|---|---|---|
| JP | 2015/123743 A | 7/2015 |
| JP | 2016-198958 A | 12/2016 |
| WO | WO 2014/071135 A1 | 5/2014 |
| WO | 2015/019070 A1 | 2/2015 |
| WO | 2016/113212 A1 | 7/2016 |

OTHER PUBLICATIONS

Machine Translation and Notification of Reasons for Refusal issued in connection with corresponding JP Application No. 2017-011742 dated Jun. 26, 2018.

Machine Translation and First Office Action and Search issued in connection with corresponding CN Application No. 201710074275.3 dated Jul. 16, 2018.

European Office Action Corresponding to Application No. 17155569 dated Mar. 25, 2020.

* cited by examiner

PRIOR ART

FIG. 6

METHODS AND BREAKABLE SUPPORTS FOR ADDITIVE MANUFACTURING

INTRODUCTION

The present disclosure generally relates to methods for additive manufacturing (AM) that utilize support structures in the process of building objects, as well as novel support structures to be used within these AM processes.

BACKGROUND

AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

Figure 1:
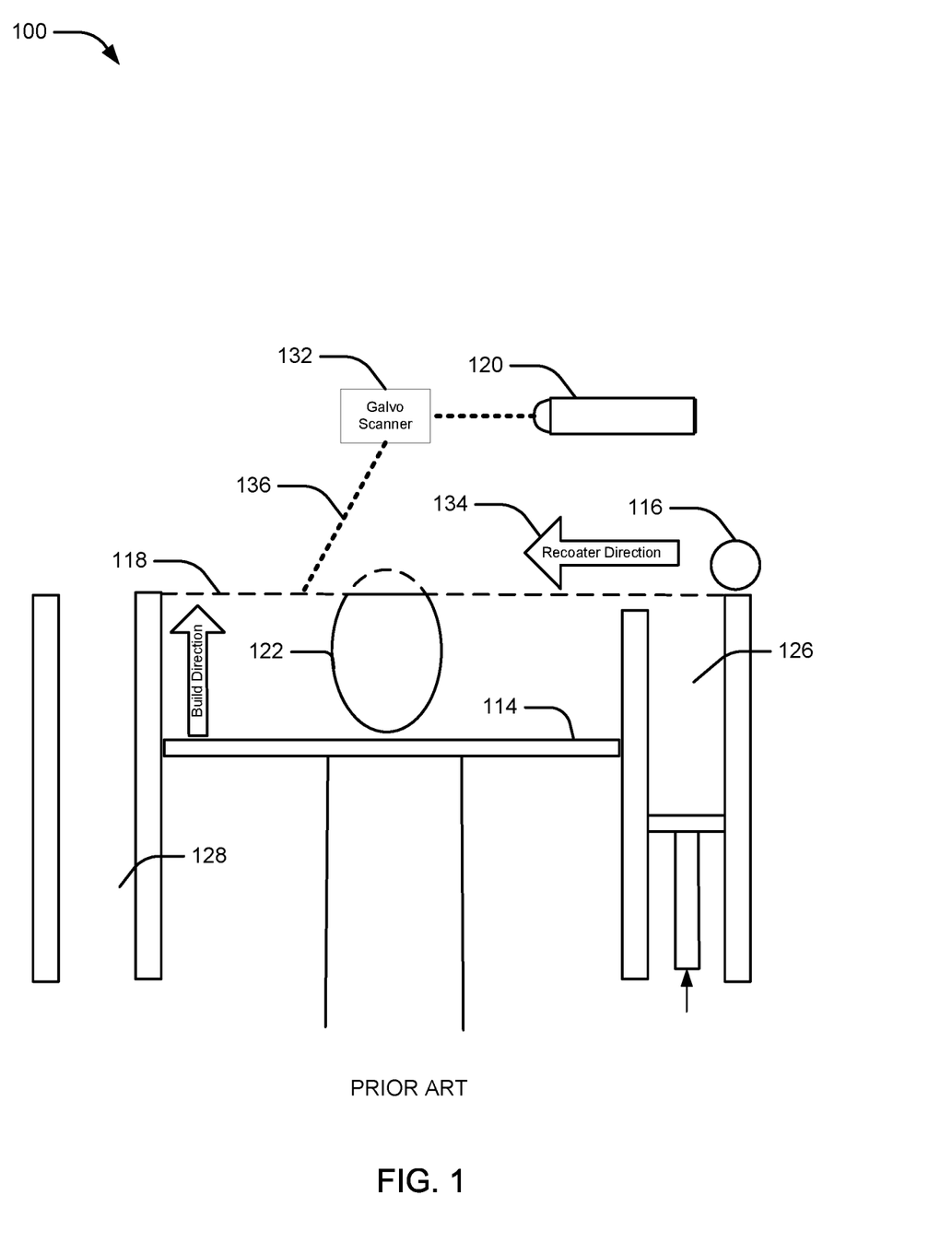
FIG. 1 is schematic diagram showing an example of a conventional apparatus for additive manufacturing.

FIG. 1 is schematic diagram showing a cross-sectional view of an exemplary conventional system 100 for direct metal laser sintering (DMLS) or direct metal laser melting (DMLM). The apparatus 100 builds objects, for example, the part 122, in a layer-by-layer manner by sintering or melting a powder material (not shown) using an energy beam 136 generated by a source such as a laser 120. The powder to be melted by the energy beam is supplied by reservoir 126 and spread evenly over a build plate 114 using a recoater arm 116 travelling in direction 134 to maintain the powder at a level 118 and remove excess powder material extending above the powder level 118 to waste container 128. The energy beam 136 sinters or melts a cross sectional layer of the object being built under control of the galvo scanner 132. The build plate 114 is lowered and another layer of powder is spread over the build plate and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of access powder by, for example, blowing or vacuuming. Other post processing procedures include a stress release process. Additionally, thermal and chemical post processing procedures can be used to finish the part 122.

During laser sintering/melting processes, the three-dimensional object is subject to numerous stresses due to the recoating of additional layers of powder as the object is built. The present inventors have discovered that certain AM structures, for example hollow structures, tend to experience deformation. In some cases, the deformation may relate to the movement of the recoater arm as it moves past the object being built. In view of the above, it can be appreciated that there are problems, shortcomings or disadvantages associated with AM techniques, and that it would be desirable if improved methods of supporting objects and support structures were available.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the disclosure provides a method for fabricating an object in a powder bed, comprising the steps of: (a) irradiating a layer of powder in the powder bed to form a fused region; (b) providing a subsequent layer of powder over the powder bed by passing a recoater arm over the powder bed from a first side of the powder bed; and (c) repeating steps (a) and (b) until the object and at least one support structure is formed in the powder bed, wherein the support structure comprises a weakened portion and the object comprises an outlet; and (d) breaking the removable support structure at the weakened portion into at least two parts.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Figure 2:
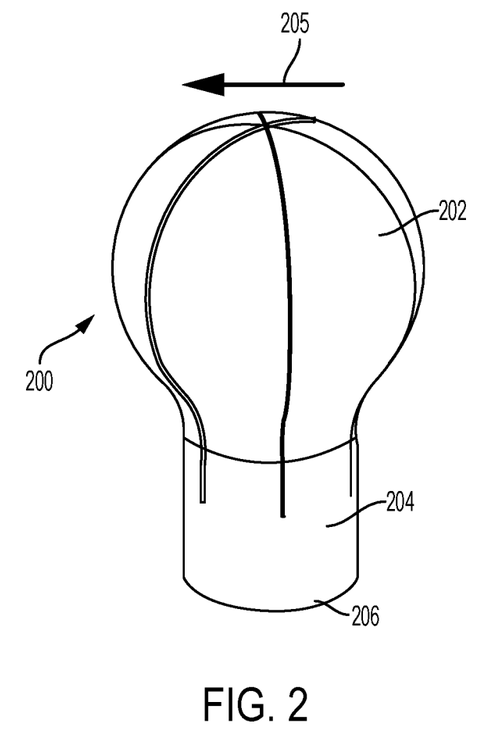
FIG. 2 illustrates a perspective view of an example of an object supported by a support structure in accordance with aspects of the present invention.
Figure 3:
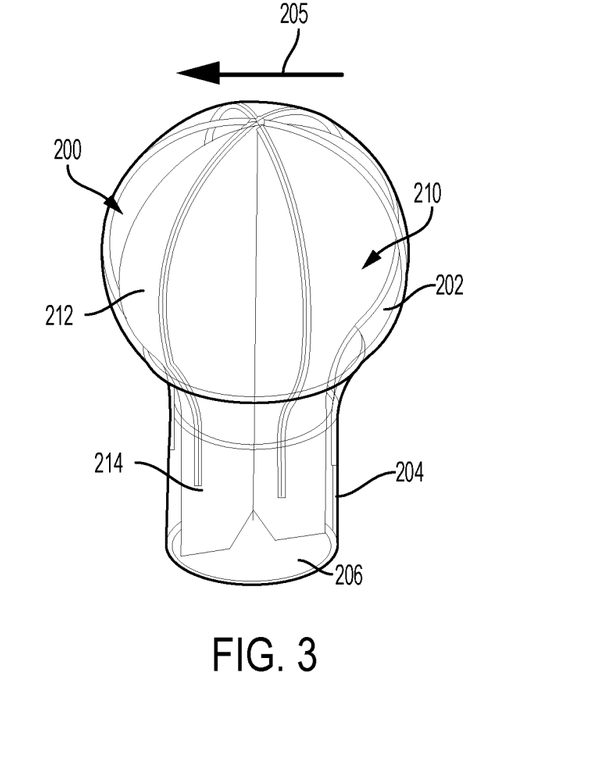
FIG. 3 illustrates a perspective view of the example object and support structure of FIG. 2 with the object transparent, in accordance with aspects of the present invention.
Figure 4:
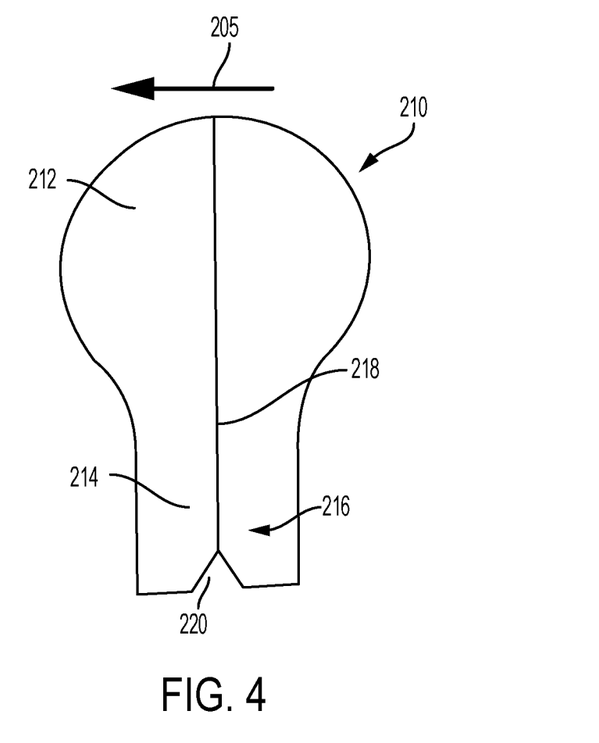
FIG. 4 illustrates a front view the example support structure of FIG. 2 in accordance with aspects of the present invention.

FIGS. 2 and 3 illustrate an example object 200 surrounding an example support structure 210. FIG. 3 shows the object 200 transparently so that the support structure 210 within the object 200 is visible. FIG. 4 shows a front view of the support structure 210 with the object 200 omitted for clarity. The support structure 210 and the object 200 may be manufactured according to an AM process. For example, the apparatus 100 of FIG. 1 and method described above may be used. In this type of AM process, the object 200 is built layer-by-layer by selectively sintering or melting areas of the powder in the regions that form the object 200. The support structure 210 is built simultaneously with the object 200 by melting or sintering additional regions of the powder in the location of the support structure 210. The arrows 205 in FIGS. 2 and 3 denote the direction of the recoater arm as it provides a fresh layer of powder at each stage of the object's build. Preferably, the support structure 210 is within the object 200 along the direction of the recoater arm.

Upon completion of the AM process, the support structure 210 is removed from the object 200. In one aspect, the support structure 210 is attached along with the object to the build plate and may be detached from the build plate and discarded. The support structure 210 may alternatively be formed without attachment to the build plate as a free standing object within the powder bed. In addition, the support structure may include a point of attachment to the object 200 that may be readily broken away once the AM process is complete. This may be accomplished by providing a breakaway structure—a small tab of metal joining the object 200 and support structure 210. The breakaway structure may also resemble a perforation with several portions of metal joining the object 200 and support structure 210.

The removal of the support structure 210 from the object 200 may take place immediately upon, or during, removal of the object from the powder bed. Alternatively, the support structure may be removed after any one of the post-treatment steps. For example, the object 200 and support structure 210 may be subjected to a post-anneal treatment and/or chemical treatment and then subsequently removed from the object 200 and/or build plate. As will be discussed in more detail below, the support structure 210 may be broken into a plurality of pieces (e.g., 2 or more) as part of the removal process.

The present inventors have found that support structures 210 are particularly desirable in forming objects 200 that have hollow internal spaces, such as spherical shapes. In the example aspect illustrated in FIGS. 2 to 6, the object 200 may include a wider first portion 202 that transitions into a narrower second portion 204. For example, as illustrated in FIG. 2, the wider first portion 202 may be a spherical shaped portion having a first diameter and narrower second portion 204 may be a cylindrical portion having a second diameter, where the first diameter is larger than the second diameter. Each of the first and second portions 202, 204 of the object 200 may be hollow (FIG. 3). Because the object 200 may be hollow, the support structure 210 may be used internally along the recoater direction to support the object 200 as part of the object manufacturing process. The object 210 may further include an outlet 206. The outlet 206 may be located at the end of the second portion 204 of the object 200.

As illustrated in FIG. 3, the support structure 210 may have a congruent geometry to match the inside shape of the object 200. For example, the support structure 210 may include a first portion 212 that fits within and contacts the inside surface of the first portion 202 of the object 200 and may include a second portion 214 that fits within and contacts the inside surface of the portion 204 of the object 200. As illustrated in FIG. 3, the first portion 212 and the second portion 214 of the support structure 210 need not cover the entire inside surface of the first and second portions 202, 204 of the object 200. For example, the first portion 212 of the support structure 210 may have a circular disk shape rather than a sphere shape. The first portion 212 may have a width that is approximately equal to the diameter of the first portion 202 of the object 200. However, the thickness of the first portion 212 may be many times smaller than the diameter of the first portion 202 of the object 200. For example, the ratio of the diameter of the first portion 202 of the object 200 to the thickness of the first portion 212 of the support structure 210 may be 50:1 to 5:1, 40:1 to 10:1, or 30:1 to 20:1. Any dimensions of the first portion 212 of the support structure 210 that are sufficient to internally support the hollow first portion 202 of the object 200 may be used. With respect to the second portion 214 of the support structure 210, it may have thin rectangular shape rather than a cylindrical shape. The rectangular shape may have a width that is approximately equal to the diameter of the second portion 204 of the object 200. However, the thickness of the second portion 214 of the support structure 210 may be many times smaller than the diameter of the second portion 204 of the object 200. For example, the ratio of the diameter of the first portion 202 of the object 200 to the thickness of the second portion 214 of the support structure 210 may be 50:1 to 5:1, 40:1 to 10:1, or 30:1 to 20:1. Any dimensions of the second portion 214 of the support structure 210 that are sufficient to internally support the hollow second portion 204 of the object 200 may be used. The same is applicable to the second portion 214 of the support structure 210.

The support structure 210 may further include a weakened portion 216. As illustrated in FIG. 4, the weakened portion may include a notch 220 and a perforation 218. The notch 220 may be disposed at a periphery of the second portion 214 of the support structure 210. The term notch is meant to include any interruption in the border of the structure that serves as a starting point for breaking and/or tearing. Thus, the term notch includes, nick, slit, slot, split, slash, cut, divide, and the like. The notch may be triangular in shape. As shown in FIG. 4, the triangular notch may be oriented such that a point of the notch points directly towards the second portion 214 of the support structure 210. A triangular notch having such an orientation allows the operator to easily start a break/tear line at the apex of the triangle notch. It is within the scope of the invention, however, that any shaped notch or equivalent thereof can be used. For example, the notch may be a slit or any other shape capable of introducing a break/tear line into the support structure 210. Generally, the notch is large enough to allow the operator to begin a break/tear line by applying a breaking/tearing force at the notch. The perforation 218 may begin from the apex of the notch 220 and extend all the way along the entire height/length of the support structure 210, terminating at the end of the first portion 212 of the support structure 210. The perforation 218 may include perforated lines, score lines, partial-score lines, non-continuous cut lines, or any other series of holes, deformations, dimples, depressions, or points of reduced thickness for facilitating a break/tear line through the support structure 210.

Figure 5:
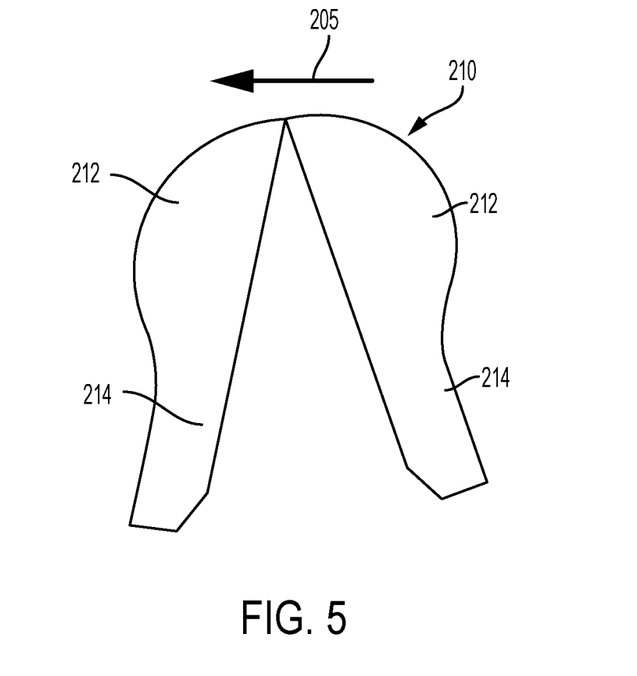
FIG. 5 illustrates a front view of the example support structure of FIG. 2 after breaking the support structure in accordance with aspects of the present invention.
Figure 6:
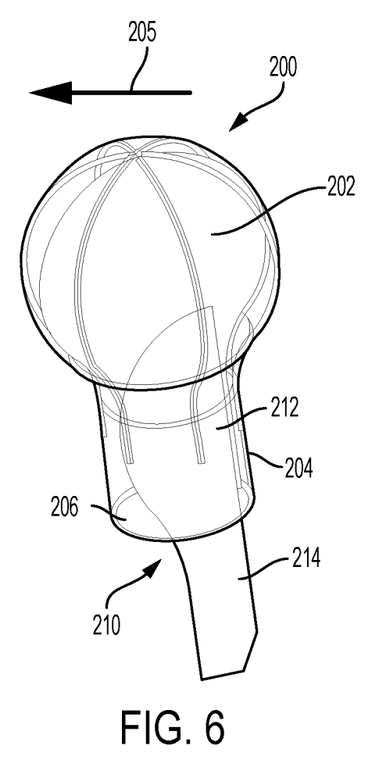
FIG. 6 illustrates a perspective view of a portion of the example support structure of FIG. 2 after breaking and being partially removed from the example object of FIG. 2 in accordance with aspects of the present invention.

As illustrated in FIG. 3, due to the geometry of the support structure 210 and geometry of the object 200, and more particularly due to the geometry of the first portion 212 of the support structure 210 have a width greater than the diameter of the second portion 204 of the object 200, the support structure 210, it is not possible to remove the entire support structure 210 directly downwardly through the opening 206. For example, if one were to attempt to pull support structure 210 downwardly through the outlet 206 without breaking/tearing it, first portion 212 of the support structure 210 would prevent the movement. However, by breaking the support structure 210 via the weakened portion 216 into two smaller pieces (FIG. 5), the operator can then remove one piece at a time through the outlet 206. FIG. 5 shows the support structure 210 split along the perforation 218. FIG. 6 shows one half of the support structure 210 being removed through the outlet 206 after breaking the support structure 210.

While FIGS. 2-6 show example geometries in which a support structure may pass through an outlet of the object after breaking the support structure, any variety of geometries for the support structure and the object may be selected. Generally, the support structure and the object will have congruent geometries. Furthermore, while FIGS. 2-6 show a single notch and a single perforated line for breaking the support structure into two pieces, any number of notches (e.g., 2, 3, 4, 5, etc.) and corresponding perforations may be implemented to break the support structure into multiple pieces. The support structure 210 provides mechanical support to the object to prevent distortion due to stress or recoater contact.

While not illustrated, the support structure 210 may further include one more connecting rib integrally connected with the object 200. The connecting ribs would extend from the surface of the support structure to the inner surface of the object 200. The connecting ribs may be formed incrementally along the height of the support structure 210. The connecting rib may form a breakaway structure that allows removal of the support structure 210 from the object 200 as desired.

When it becomes necessary to remove the support structure 210 from the object 200 the operator may apply force to break the support structure free when connecting ribs are present. The support structure may be removed by mechanical procedures such as twisting, breaking, cutting, grinding, filing, or polishing. Additionally, thermal and chemical post processing procedures may be used to finish the object. When powder has been placed between the object and the support structure during manufacturing, the powder can simply be removed by blowing, for example. The operator may then further apply a tearing or breaking force via the notch 220 to impart a breaking or tearing along the perforation 218. The application of force may be applied to cause the support structure 210 to tear/break all the way along the perforation 218 (FIG. 5). Once broken into pieces, the operator may then remove one piece at a time through the outlet 206 of the object 200 (FIG. 6).

Although several examples of support structures and objects have been provided, it should be apparent that other objects may be built in accordance with the present disclosure. For example, any object having high aspect ratio and think walls may be supported by one or more of the disclosed support structures. In an aspect, the disclosed support structures are used to manufacture parts for aircraft. For example, a fuel nozzle similar to the one disclosed in U.S. Pat. No. 9,188,341 may be manufactured using support structures disclosed herein.

In an aspect, multiple supports described above may be used in combination to support fabrication of an object, prevent movement of the object, and/or control thermal properties of the object. That is, fabricating an object using additive manufacturing may include use of one or more of: scaffolding, tie-down supports, break-away supports, lateral supports, conformal supports, connecting supports, surrounding supports, keyway supports, breakable supports, leading edge supports, or powder removal ports. The following patent applications include disclosure of these supports and methods of their use:

U.S. patent application Ser. No. 15/042,019, titled "METHOD AND CONFORMAL SUPPORTS FOR ADDITIVE MANUFACTURING", and filed Feb. 11, 2016;

U.S. patent application Ser. No. 15/042,024, titled "METHOD AND CONNECTING SUPPORTS FOR ADDITIVE MANUFACTURING", and filed Feb. 11, 2016;

U.S. patent application Ser. No. 15/041,973, titled "METHODS AND SURROUNDING SUPPORTS FOR ADDITIVE MANUFACTURING", and filed Feb. 11, 2016;

U.S. patent application Ser. No. 15/042,010, titled "METHODS AND KEYWAY SUPPORTS FOR ADDITIVE MANUFACTURING", and filed Feb. 11, 2016;

U.S. patent application Ser. No. 15/041,991, titled "METHODS AND LEADING EDGE SUPPORTS FOR ADDITIVE MANUFACTURING", and filed Feb. 11, 2016; and U.S. patent application Ser. No. 15/041,980, titled "METHOD AND SUPPORTS WITH POWDER REMOVAL PORTS FOR ADDITIVE MANUFACTURING", and filed Feb. 11, 2016.

The disclosure of each of these application are incorporated herein in their entirety to the extent they disclose additional support structures that can be used in conjunction with the support structures disclosed herein to make other objects.

Additionally, scaffolding includes supports that are built underneath an object to provide vertical support to the object. Scaffolding may be formed of interconnected supports, for example, in a honeycomb pattern. In an aspect, scaffolding may be solid or include solid portions. The scaffolding contacts the object at various locations providing load bearing support for the object to be constructed above the scaffolding. The contact between the support structure and the object also prevents lateral movement of the object.

Tie-down supports prevent a relatively thin flat object, or at least a first portion (e.g. first layer) of the object from moving during the build process. Relatively thin objects are prone to warping or peeling. For example, heat dissipation may cause a thin object to warp as it cools. As another example, the recoater may cause lateral forces to be applied to the object, which in some cases lifts an edge of the object. In an aspect, the tie-down supports are built beneath the object to tie the object down to an anchor surface. For example, tie-down supports may extend vertically from an anchor surface such as the platform to the object. The tie-down supports are built by melting the powder at a specific location in each layer beneath the object. The tie-down supports connect to both the platform and the object (e.g., at an edge of the object), preventing the object from warping or peeling. The tie-down supports may be removed from the object in a post-processing procedure.

A break-away support structure reduces the contact area between a support structure and the object. For example, a break-away support structure may include separate portions, each separated by a space. The spaces may reduce the total size of the break-away support structure and the amount of powder consumed in fabricating the break-away support structure. Further, one or more of the portions may have a reduced contact surface with the object. For example, a portion of the support structure may have a pointed contact surface that is easier to remove from the object during post-processing. For example, the portion with the pointed contact surface will break away from the object at the pointed contact surface. The pointed contact surface stills provides the functions of providing load bearing support and tying the object down to prevent warping or peeling.

Lateral support structures are used to support a vertical object. The object may have a relatively high height to width aspect ratio (e.g., greater than 1). That is, the height of the object is many times larger than its width. The lateral support structure is located to a side of the object. For example, the object and the lateral support structure are built in the same layers with the scan pattern in each layer including a portion of the object and a portion of the lateral support structure. The lateral support structure is separated from the object (e.g., by a portion of unmelted powder in each layer) or connected by a break-away support structure. Accordingly, the lateral support structure may be easily removed from the object during post-processing. In an aspect, the lateral support structure provides support against forces applied by the recoater when applying additional powder. Generally, the forces applied by the recoater are in the direction of movement of the recoater as it levels an additional layer of powder. Accordingly, the lateral support structure is built in the direction of movement of the recoater from the object. Moreover, the lateral support structure may be wider at the bottom than at the top. The wider bottom provides stability for the lateral support structure to resist any forces generated by the recoater.

Moreover a method of fabricating an object may include consecutively, concurrently, or alternatingly, melting powder to form portions of multiple supports as described above. Additionally, for an object fabricated using multiple supports, the post-processing procedures may include removing each of the supports. In an aspect, a support structure may include multiple supports of different types as described herein. The multiple supports may be connected to each other directly, or via the object. The selection of supports for a specific object may be based on the factors described herein (e.g., shape, aspect ratios, orientation, thermal properties, etc.)

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method for fabricating an object in a powder bed, comprising the steps of:
   (a) irradiating a layer of powder in the powder bed to form a fused region;
   (b) providing a subsequent layer of powder over the powder bed by passing a recoater arm over the powder bed from a first side of the powder bed;
   (c) repeating steps (a) and (b) until the object and at least one support structure is formed in the powder bed, wherein the at least one support structure comprises a weakened portion, the weakened portion comprises a notch, and the object comprises an outlet; and
   (d) breaking the at least one support structure at the weakened portion into at least two parts.

2. The method of claim 1, wherein the weakened portion comprises a perforation aligned with the notch.

3. The method of claim 2, wherein the perforation begins from an apex of the notch.

4. The method of claim 1, wherein a portion of the at least one support structure is formed with and fits within the object and is capable of passing through the outlet after breaking the support structure via the weakened portion.

5. The method of claim 1, further comprising:
   (e) removing at least one of the two parts of the at least one support structure from the object by passing the part through the outlet of the object, wherein a portion of the at least one support structure is formed with and fits within the object.

6. The method of claim 1, wherein:
   the object comprises a first portion having a first diameter and a second portion having a second diameter,
   the at least one support structure has a first portion having a first width and a second portion having a second width, and
   the first width of the at least one support structure is larger than the second diameter of the object.

7. The method of claim 6, wherein:
   the first portion of the object having the first diameter surrounds the first portion of the at least one support structure having the first width, and
   the second portion of the object having the second diameter surrounds the second portion of the at least one support structure having the second width.

8. The method of claim 1, wherein the object is hollow.

9. The method of claim 1, wherein the powder comprises a material selected from the group consisting of engineering plastics, thermoplastic elastomers, metals, and ceramics.

10. The method of claim 1, wherein the irradiating step uses a laser beam.

11. The method of claim 1, wherein the irradiating step uses an electron beam.

12. The method of claim 1, wherein the irradiating step uses electromagnetic radiation.

13. The method of claim 1, wherein the at least one support structure and the object have congruent geometries.

14. The method of claim 1, wherein the at least one support structure geometry matches the inside shape of the object.

15. The method of claim 1, wherein the notch is triangular.

16. The method of claim 1, wherein the notch comprises an interruption in the border of the at least one support structure that serves as a starting point for breaking and/or tearing.

17. The method of claim 1, wherein the notch comprises an interruption selected from the group consisting of a nick, slit, slot, split, slash, cut, and divide.

18. The method of claim 1, wherein the notch is a shape capable of introducing a break or tear line into the at least one support structure.

19. The method of claim 1, wherein the object is selected from the group consisting of complex workpieces, patterns for investment casting, metal molds for injection molding, metal molds for die casting, molds for sand casting, and cores for sand casting.

* * * * *